US005516042A

United States Patent [19]

Gerstengerger

[11] Patent Number: 5,516,042

[45] Date of Patent: May 14, 1996

[54] THERMALLY ACTIVATED TWO-WAY VALVE

[75] Inventor: Gerald Gerstengerger, Bradenton, Fla.

[73] Assignee: Dana Corporation, Toledo, Ohio

[21] Appl. No.: 341,111

[22] Filed: Nov. 18, 1994

[51] Int. Cl.[6] .................... G05D 23/00

[52] U.S. Cl. .................... 236/93 A; 236/100

[58] Field of Search .................... 236/93 R, 93 A, 236/100

[56] References Cited

U.S. PATENT DOCUMENTS

| | | | |
|---|---|---|---|
| 3,913,831 | 10/1975 | Talak et al. . | |
| 4,036,433 | 7/1977 | Wagner et al. . | |
| 4,190,198 | 2/1980 | Casuga et al. | 236/93 A |
| 4,488,680 | 12/1984 | Itoh . | |

FOREIGN PATENT DOCUMENTS

| | | | |
|---|---|---|---|
| 1241220 | 5/1967 | Germany | 236/93 |
| 1272681 | 5/1972 | United Kingdom | 236/93 A |

*Primary Examiner*—F. Daniel Lopez
*Attorney, Agent, or Firm*—Millen, White, Zelano, & Branigan

[57] ABSTRACT

A two-way thermally activated valve is configured within a valve body having a bore therethrough which communicates with an inlet port, an outlet port and an exhaust port. A valve spool is disposed within the bore. The valve spool has a relieved portion which permits continual communication between the inlet port and outlet port regardless of the position of the valve spool. When the valve spool is in a first mode, the exhaust port is in communication with the bore and, when the valve spool is a second mode, the exhaust port is blocked. Since the inlet and outlet ports are never blocked, pressure builds at the outlet port as the exhaust port closes. The valve is shifted from the first position to the second position as a thermally expandable wax element pushes the spool axially against the bias of a coil spring. The two-way thermally activated valve is used to cause high pressure fluid to operate a fan driven by a hydraulic motor when the exhaust port of the valve is closed by allowing the high pressure fluid to flow to the tank only as exhaust from the motor when the temperature level is sufficient to expand the wax plug. When the wax plug is unexpanded because the oil is cooled, the oil flows through the exhaust port of the valve to tank and, therefore, does not allow sufficient pressure to build in the outlet port of the valve to drive the motor.

7 Claims, 4 Drawing Sheets

THERMALLY ACTIVATED TWO-WAY VALVE

FIELD OF THE INVENTION

The present invention relates to a thermally activated two-way valve. More particularly, the present invention relates to a thermally activated two-way valve which is use with hydraulic motors or drives.

BACKGROUND ART

Hydraulic systems operating large hydraulic devices, such as hydraulic cranes, require cooling of the hydraulic system oil when the system is operating under a heavy load for an extended period of time. The current practice is to utilize a pilot operated, ventable relief valve and temperature sensor. When the relief valve is turned on and off to start or stop the fan motor, there is an abrupt change in the hydraulic system which causes shocks to be generated through the system. These shocks are transmitted to the crane structure and are readily noticeable to the operator of the crane. Anything which disturbs the smooth operation of the crane is disconcerting to the operator, and over time may degrade the hydraulic system utilized with the crane. While this phenomenon is especially noticeable with large hydraulic cranes, the phenomenon also occurs in other hydraulic equipment in which it is necessary to cool hydraulic system oil.

The prior art, not necessarily associated with hydraulic cranes, includes a number of arrangements in which heated wax is used to push a valve spool from a first position in which flow is allowed through a port to a second position in which the spool blocks flow through the port. These valves may also include additional ports which are opened when the first ports are closed. None of these valves utilize the concept of expanding a heated wax plug in a valve in which hydraulic oil is allowed to bleed off so that insufficient pressure is provided to operate an associated hydraulic device, such as a fan motor, unless the valve is closed.

SUMMARY OF THE INVENTION

It is a function of the present invention to provide a new and improved thermostatically operated two-way valve.

The present invention is directed to a thermostatically operated two-way valve comprising a valve body having an inlet port and an outlet port for hydraulic oil in communication with a bore through the valve body. In a first mode, the valve allows hydraulic fluid to bleed through the valve to a reservoir, and in a second mode, the valve blocks bleeding and applies hydraulic fluid at operating pressure to a hydraulic device.

In a more specific embodiment, the invention includes a spool seated in the valve body. The spool has a relieved portion in continuous communication with inlet and outlet ports. An exhaust port is positioned in the body in communication with the spool for exhausting hydraulic fluid from the body when the spool is in a first position. A spring biases the spool to the first position and a plug of thermally expandable material, disposed between the spool and the body, urges the spool against the bias of the spring from the first position to a second position in which the spool interrupts communication with the exhaust port.

In accordance with an application of the invention, the inlet port is connected to a line adapted to apply pressurized hydraulic fluid through the valve from a source of pressurized hydraulic fluid to a device operated by the hydraulic fluid. The exhaust port exhausts to tank until the fluid reaches a preselected temperature level wherein the thermally activated element then expands. Pressurized fluid then no longer flows past the spool and all of the pressurized fluid flows through the valve to operate the device.

In a further aspect, the valve of the present invention is used in combination with a hydraulically powered fan used to cool the same hydraulic oil which passes through the valve body and causes the thermally activated element to expand.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
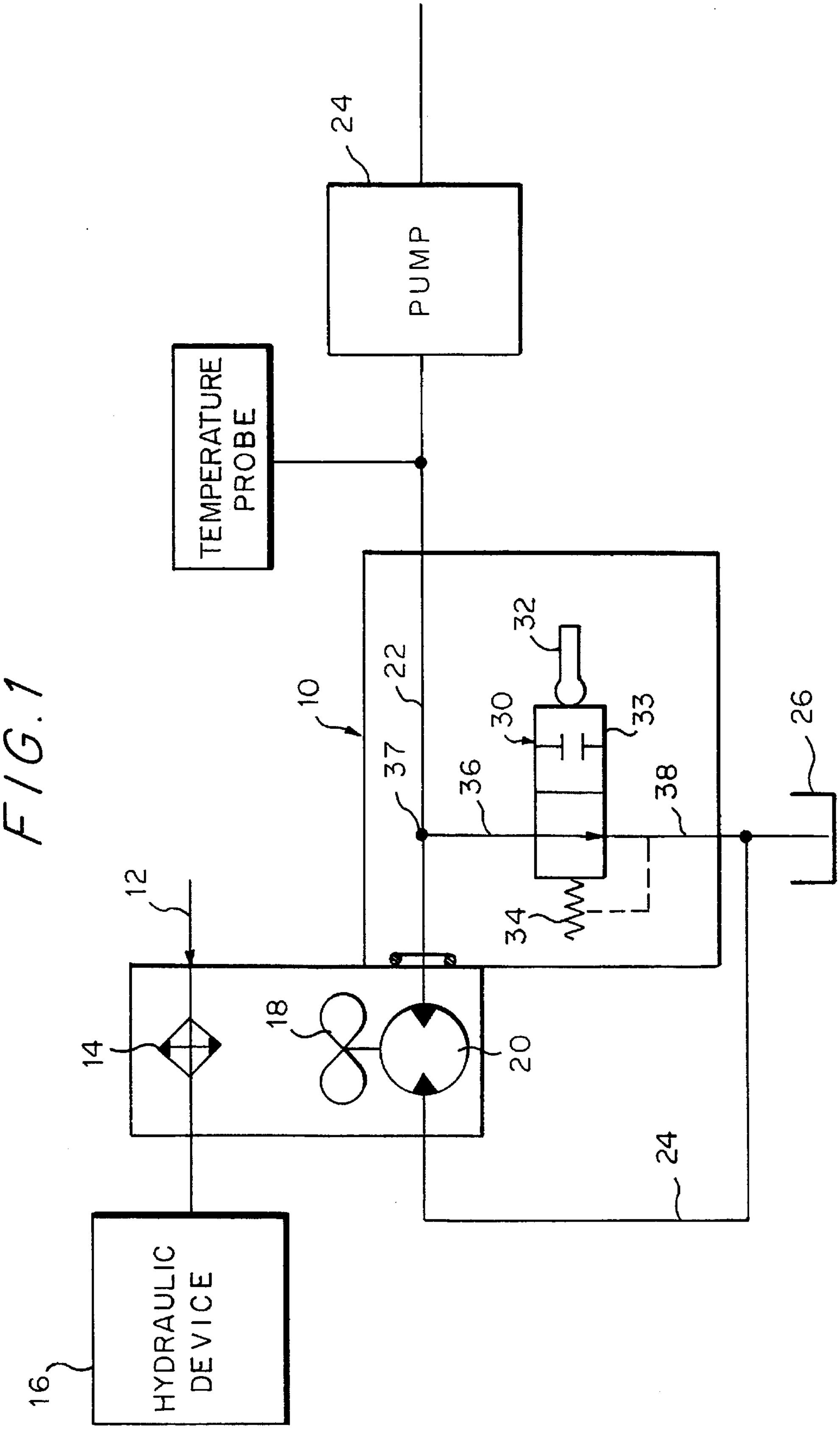
FIG. 1 is a diagrammatical view showing an arrangement in accordance with the principles of the present invention in which a two-way thermally activated valve is employed to actuate a hydraulically driven device.
Figure 2:
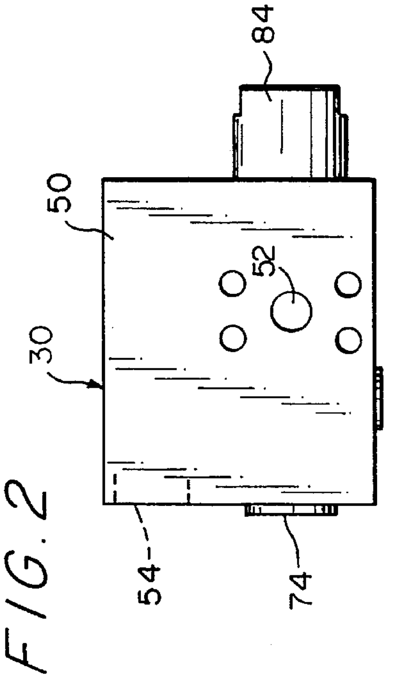
FIG. 2 is a side view of a valve body enclosing the two-way, thermally activated valve of FIG. 1.
Figure 3:
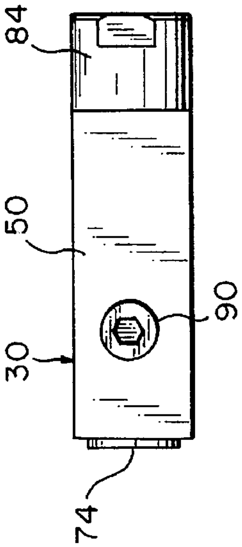
FIG. 3 is a bottom view of the valve body of FIG. 2.
Figure 4:
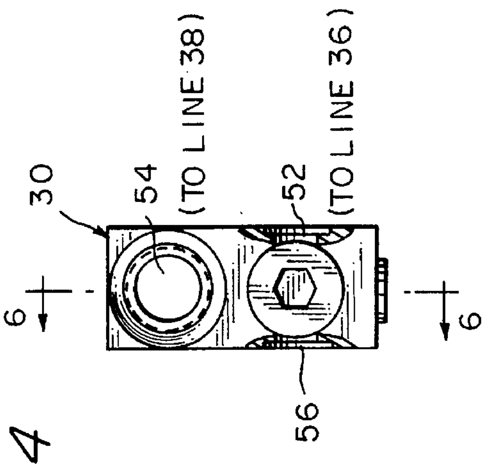
FIG. 4 is a front end view of the valve body of FIGS. 2 and 3.
Figure 5:
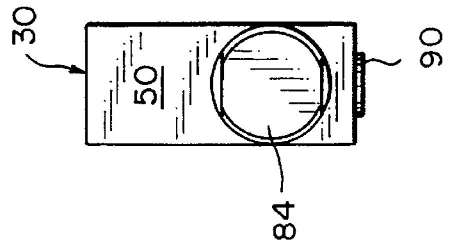
FIG. 5 is a rear end view of the valve body of FIGS. 2–4.

Referring now to FIG. 1, there is shown a diagram of a system 10 used to cool hot hydraulic oil applied by a line 12 through a radiator 14 to a manifold for use in driving various components of a hydraulic machine 16. The hydraulic machine 16 may be a device such as a large crane (not shown). When the hydraulic oil in the line 12 is heated to a selected level by operation of the hydraulic machine, it is necessary to cool the oil. For example, it may be desirable to keep the temperature of the hydraulic oil below 107° F. when the machine 16 being operated is a large hydraulic crane. In accordance with the present invention, this is accomplished by activating a fan 18 driven by a hydraulic motor 20. The hydraulic fan is powered by pressurized hydraulic fluid applied over a power line 22 by a hydraulic pump 24. The hydraulic fluid in the power line 22 is the same hydraulic fluid that flows in line 12 and is at substantially the same temperature as the fluid in line 12. After the hydraulic fluid is used to spin the fan 18 by powering the motor 20, it is exhausted by a line 24 to a tank 26.

In accordance with the principles of the present invention, a two-way valve 30, which is actuated by a thermally activated plug 32 acting on a valve spool 33 in opposition to a spring 34, is placed in parallel with the motor 20. This is done by an inlet line 36 connected to the hydraulic power line 22 at junction 37. When the hydraulic oil is below the selected level, the fluid in the line 36 passes through the valve 30 to a line 38 so that the fluid flows to the tank 26. Accordingly, there is not enough fluid pressure in the power line 22 to drive the motor 20 so as to rotate the fan 18. Upon the temperature rising to a level (107° F.) sufficient to expand the wax plug 32, the valve spool 33 is pushed from the position of FIG. 1 in which it is in an open mode to a second position in which it is in a blocking mode so that the fluid in line 22 cannot flow through the valve 30 to the tank 26. This causes all of the fluid to flow through line 22 and thus to power the motor 20.

Referring now to FIGS. 2–5, a valve body 50 is shown having an inlet port 52 which is connected to line 36 and an exhaust port 54 which is connected to the line 38 so as to flow to the tank 26. The inlet port 52 is aligned with a similar outlet port 56 on the opposite side of the valve body 50 to create a junction such as the junction 37 in the line 22 (see FIG. 1 ) so that when the valve spool 33 (FIG. 1 ) is in either the first or the second mode, the ports 52 and 56 are always open. When the valve 30 is in the first mode, the exhaust port 54 is also open so that the hydraulic fluid drains to the tank 26 instead of flowing full force through the valve 30 by flowing from port 52 to port 56.

Figure 6:
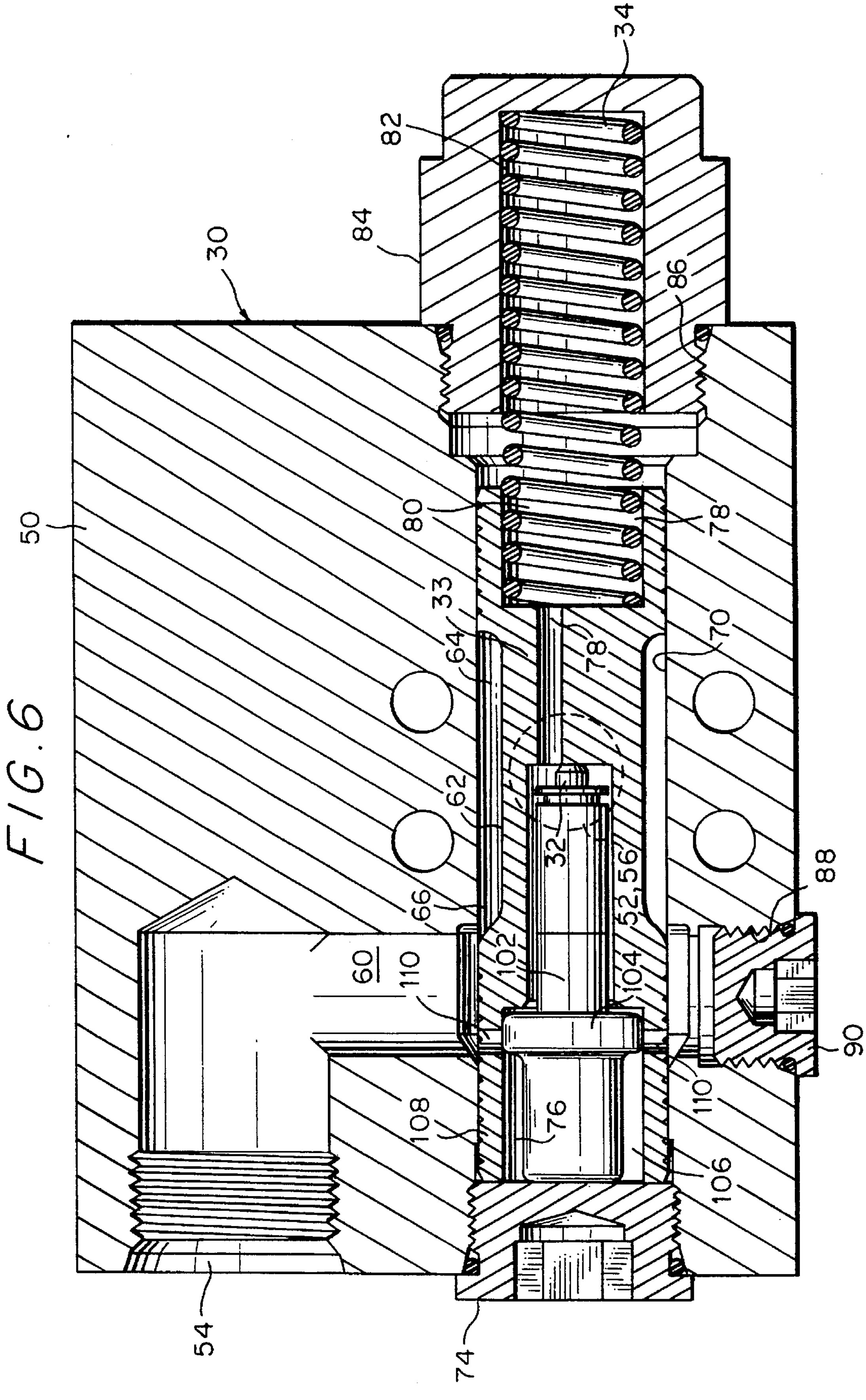
FIG. 6 is an elevation taken along lines 6—6 of FIG. 4 showing a valve spool within the valve body in a first position.

Referring now to FIG. 6, the valve 30 is in the first mode because the valve stem 33 is urged to the left by the spring 34 against the unexpanded thermoplug 32. The exhaust port 54 is connected by a passage 60 to a small diameter or relieved portion 62 of the spool 33 which forms an annular space 64 in communication with the inlet and exhaust ports 52 and 56, respectively, through a gap 66. Consequently, cool hydraulic oil flowing into inlet port 52 and out of outlet port 56 also flows through the gap 66 and out of the exhaust port 54 to tank. Accordingly, the resistance of the driven element such as the motor 20 of FIG. 1 causes the oil entering port 52 to flow through the exhaust port 54 instead of out of outlet port 56.

For ease of assembly, the valve body 50 has already therein a bore 70 therethrough in which the spool 33 is slidably mounted. A first end 72 of the bore 70 is closed by a plug 74 after the expandable wax plug 32 is inserted into a cavity 76 within the spool 33. An internal bore 78 communicates with a cavity in a recessed first end 80 of the spool 33 in which is seated one end of the spring 34. The other end of the spring 34 is retained within a bind bore 82 and plug 84 which is threaded in the housing 50 at the opposite end 86 of the bore 70. The exhaust port 54 is normally connected to a port 88; however, with this application of the valve body 50, the port 88 is closed with a threaded plug 90.

Figure 7:
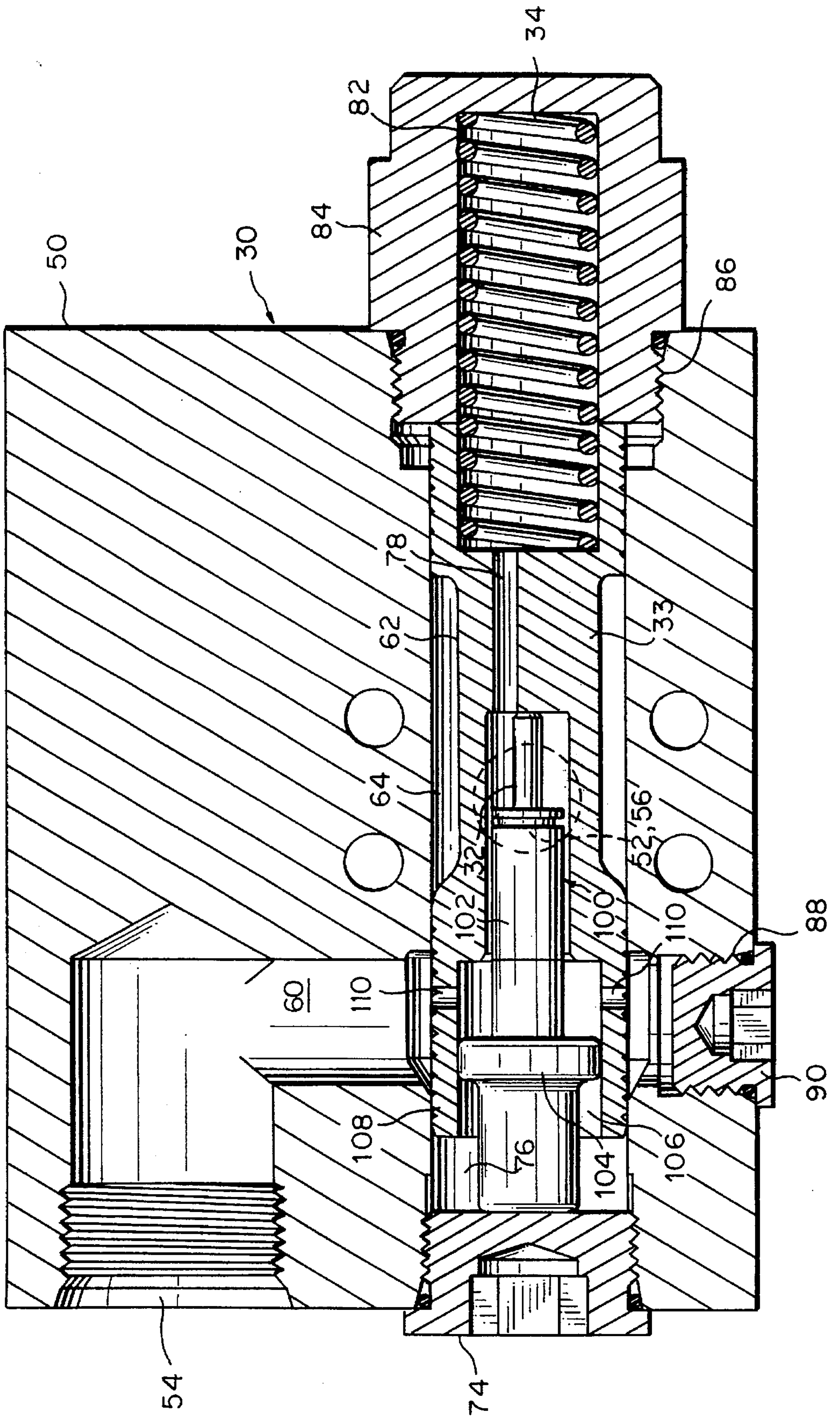
FIG. 7 is a view similar to FIG. 6 but showing the valve spool in a second position.

Referring now to FIG. 7, the second mode of the valve 30 is shown wherein the valve spool 33 closes the gap 66 of FIG. 6 so that hydraulic oil no longer flows out of the exhaust port 54 to tank. Accordingly, the hydraulic oil flows into inlet port 52 and out of outlet port 56 with sufficient force to operate a hydraulic device such as the fan motor 20 of FIG. 1. A condition then exists wherein the valve 30 blocks flow to the tank 26 and the fluid which is not flowing through to the tank is pressurized so as to operate a device such as the motor 20. In other words, the flow is analogous to the flow through line 22 in FIG. 1 wherein no hydraulic fluid exhausts through line 36 to the tank 26.

Since the wax plug 32 expands gradually upon the selected temperature level being reached, the gap 66 connecting annular space 64 to the passage 60 is closed gradually. This means that the motor 20 does not start abruptly but rather gradually builds up speed as the gap 66 closes. This results in the system adjusting relatively slowly to the operation of the fan 18 so that shocks are not delivered to the hydraulic system and to the device operated by the hydraulic system. Consequently, operation is smooth.

The thermal element 32 is part of a thermal assembly 100 which includes a barrel portion 102 having a rim 104. The barrel portion 102 is received in a cavity 106 in a second end 108 of the valve spool 33. A pair of lateral bores 110 communicate the cavity 106 with the exhaust port 54. The ports 110 allow fluid which has accumulated in the cavity 106, due to the spool 33 being moved to close the exhaust port 54, to flow out to the exhaust port. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A two-way thermally activated valve comprising:

a valve body having an inlet port, an outlet port and an exhaust port each connected to a bore;

a valve spool disposed within and in direct contact with the bore without O-ring seals therebetween for movement between a first position in which the exhaust port is open to the bore and to the inlet and outlet ports are open to the bore and a second position in which the exhaust port is blocked while the inlet and outlet ports remain open to the bore; the valve spool having a relieved portion which defines a space between the valve spool and the bore, which space is always in communication with the inlet port and the outlet port whether the spool is in the first position or the second position and the space is only in communication with the inlet port and outlet port when the spool is in the second position;

a spring for urging the spool to the first position; and a thermal expansion device positioned in opposition to the spring for urging the spool to the second position upon being heated to a selected temperature level whereby the valve allows the full application of hydraulic pressure applied at the inlet port to be applied at the outlet port when the spool is in the second position.

2. The two-way thermally activated valve of claim 1, wherein the thermal expansion device includes an element made of wax.

3. The two-way thermally activated valve of claim 1, wherein the spring and thermal expansion device are in alignment with one another and bear against plugs inserted in the body at opposite ends of the bore.

4. The two-way thermally activated valve of claim 3, wherein the thermal expansion device includes an element made of wax.

5. The two-way thermally activated valve of claim 4, wherein the spool has a first end against which the spring bears and a second end against which the thermal expansion device bears, the first and second ends being in fluid commuication via a bore extending through the spool.

6. The two-way thermally activated valve of claim 5, wherein the spring is a coil spring received in a first cavity in the first end of the spool and wherein the thermal expansion device is received in a second cavity in the second end of the spool with the first and second cavities being connected by the bore in the spool.

7. The two-way thermally activated valve of claim 6 further including at least one port connecting the second cavity in the spool to the exhaust port to bleed any fluid within the cavity to the exhaust port.

* * * * *